F. B. WALDRON.
PNEUMATIC LOAD ENGAGING MEANS.
APPLICATION FILED OCT. 6, 1920.
1,426,930.
Patented Aug. 22, 1922.
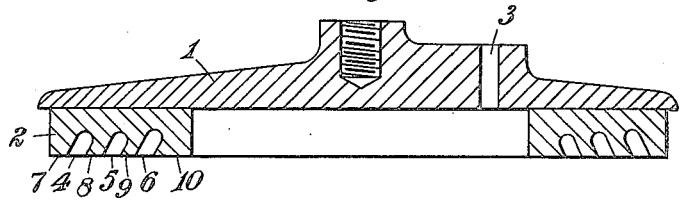
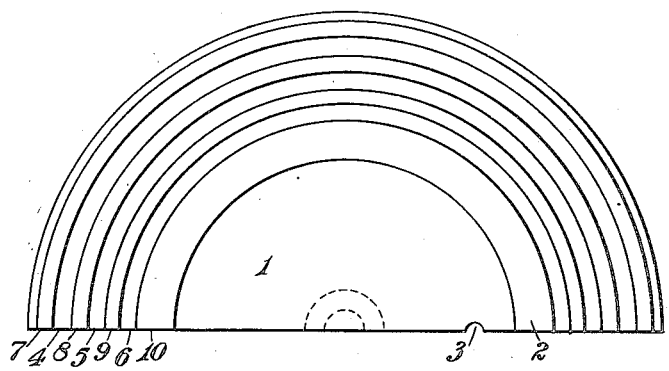
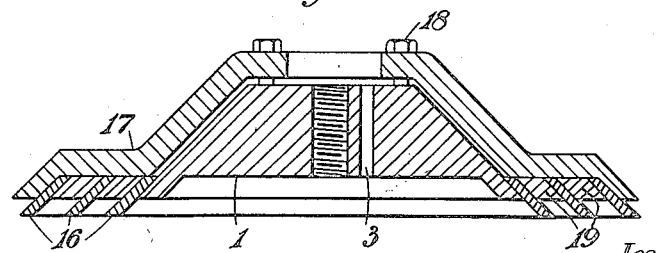
Inventor.
Frederic Barnes Waldron
By Rogers, Kennedy & Campbell
Attys.

UNITED STATES PATENT OFFICE.

FREDERIC BARNES WALDRON, OF PRESCOT, ENGLAND, ASSIGNOR TO PILKINGTON BROTHERS LIMITED, OF ST. HELENS, ENGLAND, A LIMITED LIABILITY COMPANY OF GREAT BRITAIN.

PNEUMATIC LOAD-ENGAGING MEANS.

1,426,930.               Specification of Letters Patent.     Patented Aug. 22, 1922.

Application filed October 6, 1920. Serial No. 415,122.

*To all whom it may concern:*

Be it known that I, FREDERIC BARNES WALDRON, a subject of the King of the United Kingdom of Great Britain and Ireland, and residing at Eccleston Park, Prescot, in the county of Lancaster, England, have invented new and useful Improvements in Pneumatic Load-Engaging Means, of which the following is a specification.

This invention relates to pneumatic load-engaging means such as the rubber discs or rings of suckers which are caused to attach themselves to objects for various purposes, and has for its object to provide a disc or ring which prevents the access of air into the interior of the sucker with greater certainty than has heretofore been possible with other constructions, more especially when the surface to which the sucker is attached, is rough or uneven.

The invention is particularly applicable to those suckers in which the high degree of vacuum is produced by some external air-exhausting means, with the object of permitting the application of considerable force to the sucker. In such cases the rubber of the sucker must have considerable stiffness in order to have the requisite mechanical strength, and consequently the ring cannot easily adapt itself to roughnesses and unevennesses in the surface.

In the accompanying drawings:—

Figure 1 is a diametral section of a sucker constructed according to this invention;

Figure 2 is an inverted half-plan of the same;

Figures 3 and 4 are diametral sections of modified forms of the sucker rings, and, Figure 5 is a diametral section of a further modified construction of the sucker.

Referring to the drawings, 1 is the support for the sucker ring 2, which is preferably composed of rubber vulcanized to the said support. A hole 3 through the support 1 communicates with the space in the centre of the ring 2, and is connected to a means for exhausting the air within the said central space.

A plurality of circular channels 4, 5, 6 are formed in the operative face of the ring 2, preferably by moulding, the inner wall of each channel being inclined upwards and inwards. These channels break up the operative face of the sucker ring 2 into rings 7, 8, 9, 10, and of these, the rings 8 and 9 are extremely flexible in comparison with the main body of the sucker ring 2, while the outer ring 7 and inner ring 10 are preferably of greater section so as to withstand the atmospheric pressure on the sucker. By reason of the inclination of the inner walls of the channels, the outer edges of the rings 8, 9 and 10 taper off to fine edges which are very flexible, apart from the flexibility of the whole rings.

The outer edge of the sucker may also be inclined upwards and inwards so as to have a fine edge, but, since this outer edge is exposed to damage, it is preferably formed as shown in the drawings.

If, for any reason, the outer ring 7 of the sucker, should give passage to air, the channel 4 becomes filled with air which presses upon the inclined surface of the ring 8 and thus, by reason of its flexibility and of the flexibility of its fine outer edge, is thereby pressed into any roughnesses or irregularities of the surface to which the sucker is applied.

Similarly, should the ring 8 give passage to air, the channel 5 becomes filled with air and the ring 9 can then act so as to exclude air from the interior of the sucker. The inner ring 10 also is capable of acting in a similar way by reason of the flexibility of its outer edge.

In the modification shown in Figure 3, a single channel 11 is formed in the sucker ring 2, giving a single flexible ring 12, the outer portion of the sucker ring serving to withstand the atmospheric pressure.

Figure 4 shows a modification in which two channels 13 and 14 form between them a flexible ring 15, the inner and outer rings being of greater section to withstand the pressure.

A plurality of channels greater than those shown in Figures 3 and 4, is of particular advantage in affording security when the surface to which the sucker is to be applied, is rough.

The method of producing channels in the operative surface of a sucker ring may be varied without departing from the essential features of the invention; for instance, the sucker ring may be formed of a number of suitably shaped rings held together by any convenient means. Such a construction is particularly suited to sucker rings composed of leather and is shown in Figure 5, in which 1 is the main sucker support, 3 the hole for connection with the air-exhausting means, and 16 conical rings of leather which are held to the support 1 by means of a clamping piece 17, screws 18, and annular distance pieces 19.

From the foregoing description it will be seen that the sucker ring constructed according to this invention is well adapted to heavy duty under high degrees of exhaustion, because the ring as a whole may be given any desired degree of stiffness and strength, while portions of it are given the flexibility necessary to adapt themselves to unevennesses and irregularities in the surface to which the sucker is applied.

Having described my invention, I declare that what I claim and desire to secure by Letters Patent is:—

1. A sucker ring for pneumatic load-engaging means having its operative face channelled, the inner wall of a channel being inclined inwards and upwards from the said operative face.

2. A sucker ring for pneumatic load-engaging means having in its operative face a plurality of channels, the inner wall of each channel being inclined inwards and upwards from said operative face.

3. A sucker ring for pneumatic load-engaging means having in its operative face a plurality of channels, the inner wall of at least one channel being inclined inwards and upwards from said operative face.

4. A sucker ring for pneumatic load-engaging means, divided by a channel into two rings, the two walls of at least one of which are the surfaces of cones having their apices on the side of the operative face away from the load.

5. A sucker ring for pneumatic load-engaging means, divided by channels into a plurality of rings, the two walls of at least two of which are the surfaces of cones having their apices on the side of the operative face away from the load.

6. A sucker ring for pneumatic load-engaging means, divided by a channel into two rings, the lower portion of the outer wall of at least one of which is the surface of a cone having its apex on the side of the operative face away from the load.

7. A sucker ring for pneumatic load-engaging means, divided by channels into a plurality of rings, the lower portions of the outer walls of at least two of which are the surfaces of cones having their apices on the side of the operative face away from the load.

8. In a sucker ring for pneumatic load-engaging means, a plurality of annular flexible rings, the two walls of which are the surfaces of cones having their apices on the side of the operative face away from the load, an annular distance piece between each two adjacent flexible rings, the operative edges of the flexible rings projecting beyond the corresponding edge of the intervening distance piece, so as to produce at least one channel in the operative face of the sucker ring.

In testimony whereof I have affixed my signature hereto.

FREDERIC BARNES WALDRON.